(12) United States Patent
Kim et al.

(10) Patent No.: US 12,410,503 B2
(45) Date of Patent: Sep. 9, 2025

(54) PLATED STEEL SHEET HAVING EXCELLENT CORROSION RESISTANCE AND BENDABILITY AND METHOD FOR MANUFACTURING SAME

(71) Applicant: POSCO CO., LTD, Pohang-si (KR)

(72) Inventors: Tae-Chul Kim, Gwangyang-si (KR); Sung-Joo Kim, Pohang-si (KR); Myung-Soo Kim, Pohang-si (KR); Bong-Hwan Yoo, Gwangyang-si (KR); Yong-Kyun Cho, Gwangyang-si (KR); Il-Ryoung Sohn, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/688,709

(22) PCT Filed: Sep. 27, 2022

(86) PCT No.: PCT/KR2022/014438
§ 371 (c)(1),
(2) Date: Mar. 1, 2024

(87) PCT Pub. No.: WO2023/055028
PCT Pub. Date: Apr. 6, 2023

(65) Prior Publication Data
US 2024/0360541 A1   Oct. 31, 2024

(30) Foreign Application Priority Data

Sep. 30, 2021   (KR) .......................... 10-2021-0130130

(51) Int. Cl.
*B32B 15/01*  (2006.01)
*C22C 18/04*  (2006.01)
(Continued)

(52) U.S. Cl.
CPC .............. *C23C 2/06* (2013.01); *B32B 15/013* (2013.01); *C22C 18/04* (2013.01); *C23C 2/20* (2013.01); *C23C 2/29* (2022.08); *C23C 2/40* (2013.01)

(58) Field of Classification Search
None
See application file for complete search history.

(56) References Cited

U.S. PATENT DOCUMENTS

| 6,235,410 B1 | 5/2001 | Komatsu et al. |
| 2003/0072963 A1 | 4/2003 | Komatsu et al. |

(Continued)

FOREIGN PATENT DOCUMENTS

| JP | H10-306357 A | 11/1998 |
| JP | 2000-336467 A | 12/2000 |

(Continued)

OTHER PUBLICATIONS

International Search Report and Written Opinion dated Nov. 29, 2022 issued in International Patent Application No. PCT/KR2022/014438 (with English translation).

(Continued)

*Primary Examiner* — Daniel J. Schleis
(74) *Attorney, Agent, or Firm* — Morgan Lewis & Bockius LLP (57) ABSTRACT

The present invention provides a Zn—Mg—Al plated steel sheet having excellent in corrosion resistance and bendability, and a method for manufacturing same. And more specifically, the present invention provides a Zn—Mg—Al-based plated steel sheet having excellent in corrosion resistance, bendability, and plating adhesion, and a method for manufacturing the same.

10 Claims, 4 Drawing Sheets

(51) Int. Cl.
  *C23C 2/06* (2006.01)
  *C23C 2/20* (2006.01)
  *C23C 2/28* (2006.01)
  *C23C 2/40* (2006.01)

(56) References Cited

U.S. PATENT DOCUMENTS

| | | |
|---|---|---|
| 2021/0010123 A1 | 1/2021 | Sohn et al. |
| 2021/0178727 A1 | 6/2021 | Kim et al. |
| 2021/0381091 A1 | 12/2021 | Kim et al. |
| 2022/0010420 A1 | 1/2022 | Han et al. |
| 2022/0341017 A1 | 10/2022 | Kim et al. |
| 2023/0019786 A1 | 1/2023 | Kim et al. |

FOREIGN PATENT DOCUMENTS

| | | |
|---|---|---|
| JP | 2001-295015 A | 10/2001 |
| JP | 2021-004403 A | 1/2021 |
| KR | 10-2010-0073819 A | 7/2010 |
| KR | 10-2012-0076111 A | 7/2012 |
| KR | 10-2019-0078435 A | 7/2019 |
| KR | 10-2020-0025897 A | 3/2020 |
| KR | 10-2020-0063983 A | 6/2020 |
| KR | 10-2020-0076585 A | 6/2020 |
| KR | 10-2021-0035722 A | 4/2021 |
| KR | 10-2021-0071631 A | 6/2021 |
| WO | 2018/139619 A1 | 8/2018 |
| WO | 2021/038102 A1 | 3/2021 |

OTHER PUBLICATIONS

Office Action issued in corresponding Japanese Application No. 2024-519265 dated Jul. 7, 2025, with English translation.
Burak William Cetinkaya, et al., "Impact of alkaline and acid treatment on the surface chemistry of a hot-dip galvanized Zn-Al-Mg coating", Journal of Materials Research and Technology, vol. 9, No. 6, pp. 16445-16458, Nov. 28, 2020.
Takao Tsujimura, Development of highly corrosion-resistant molten Zn-6%Al-3%Mg alloy plated steel sheet "ZAM", No. 92, 2011, pp. 1-8.

PLATED STEEL SHEET HAVING EXCELLENT CORROSION RESISTANCE AND BENDABILITY AND METHOD FOR MANUFACTURING SAME

CROSS-REFERENCE OF RELATED APPLICATIONS

This application is the U.S. National Phase under 35 U.S.C. § 371 of International Patent Application No. PCT/KR2022/014438, filed on Sep. 27, 2022, which in turn claims the benefit of Korean Application No. 10-2021-0130130, filed on Sep. 30, 2021, the disclosures of which applications are incorporated by reference herein.

TECHNICAL FIELD

The present disclosure relates to a high-corrosion resistance plated steel sheet having excellent corrosion resistance and bendability and a method for manufacturing the same.

BACKGROUND ART

When a galvanized steel sheet is exposed to a corrosive environment, a galvanized steel sheet may have sacrificial properties in which zinc, having a lower redox potential than that of iron, is corroded first, such that corrosion of a steel material may be prevented. Also, as zinc in a plating layer oxidizes, dense corrosion products may be formed on the surface of a steel material, thereby blocking the steel material from the oxidizing atmosphere and improving corrosion resistance of the steel material. Due to the advantageous properties, the application of a galvanized steel sheet has been increased to include steel sheets for construction materials, home appliances, and automobiles.

However, the corrosion environment has gradually deteriorated due to an increase in air pollution due to industrial advancement, and due to strict regulations on resource and energy conservation, the need for the development of a steel material having improved corrosion resistance than a conventional galvanized steel material has been increased.

To address this issue, various studies have been conducted on the technique of manufacturing a galvanized alloy plated steel sheet, which may improve corrosion resistance of a steel material by adding elements such as aluminum (Al) and magnesium (Mg) to a galvanizing bath. As a representative example, a Zn—Mg—Al galvanized alloy steel sheet in which Mg is further added to a Zn—Al plating composition system has been used.

Meanwhile, a Zn—Mg—Al-based galvanized alloy plated steel sheet may be often processed, but may include a large amount of intermetallic compounds having high hardness in a plating layer during a bending process, such that bending processability may be poor, such as causing cracks in the plating layer, which may be disadvantageous.

Also, while a Zn—Mg—Al based galvanized alloy steel sheet is put in a plating bath and a plating process is performed, oxides such as dross may be attached or reactivity with the steel sheet may be weakened, such that plating adhesion may be deteriorated, which may be problematic.

Accordingly, a level of technology which may satisfy the demand for high-end material having excellent corrosion resistance as well as bendability and plating adhesion has not been developed.

(Cited document 1) Korean Laid-Open Patent Publication No. 2010-0073819

DETAILED DESCRIPTION OF PRESENT DISCLOSURE

Technical Problems to Solve

An aspect of the present disclosure is to provide a plated steel sheet having excellent corrosion resistance and bendability and a method for manufacturing the same.

Also, another aspect of the present disclosure is to provide a plated steel sheet having excellent corrosion resistance, bendability, and plating adhesion and a method for manufacturing the same.

The purpose of present disclosure is not limited to the above aspects. Anyone having ordinary knowledge in the technical field to which the present disclosure belongs may have no difficulty in understanding the additional purpose of the invention from the overall description of the present disclosure.

Solution to Problem

An aspect of the present disclosure provides a plated steel sheet
comprising a base steel sheet; and a Zn—Mg—Al-based plating layer provided on at least one side of the base steel sheet,
wherein the plating layer comprises a $MgZn_2$ phase; and a Zn single phase formed along an outline of the $MgZn_2$ phase.

Another aspect of the present disclosure provides
a method for manufacturing a plated steel sheet comprising
hot-dip galvanizing a base steel sheet by immersing the base steel sheet in a plating bath comprising, by weight %, Mg: 4.0 to 7.0%, Al: 11.0 to 19.5%, and a balance of Zn and inevitable impurities to satisfy an immersing temperature of $T_B+10°$ C. to $T_B+50°$ C. based on a plating bath temperature ($T_B$);
performing air-wiping on the hot-dip galvanized steel sheet using an inert gas to satisfy relational expression 1 below; and
cooling the air-wiped steel sheet at an average cooling rate of 2 to 5° C./s until a solidification end temperature, $$0.005 \leq P_{air}/(W_{air} \times T) \quad \text{[Relational expression 1]}$$

(In the Relational expression 1, $W_{air}$ represents a spacing between air knives, and a unit is mm. $P_{air}$ represents pressure of the air knife, and a unit thereof is kPa. T represents a temperature of the supplied inert gas, and a unit thereof is ° C.)

Advantageous Effects of Invention

According to an aspect of the present disclosure, a plated steel sheet having excellent corrosion resistance and bendability and a method for manufacturing the same may be provided.

Also, according to another aspect of the present disclosure, a plated steel sheet having excellent corrosion resistance, bendability, and plating adhesion and a method for manufacturing the same may be provided.

The various and beneficial advantages and effects of the present disclosure are not limited to the above, and will be more easily understood in the course of describing specific embodiments of the present disclosure.

BEST MODE FOR INVENTION

The terms used in this specification are intended to describe specific embodiments and are not intended to limit the present disclosure. Also, an expression used in the singular encompasses the expression of the plural, unless it has a clearly different meaning in the context.

The term "comprise" used in the specification specifies components and does not exclude the presence or addition of other components.

Unless otherwise defined, the entirety of terms, including technical and scientific terms, used in this specification may refer to the same as those generally understood by those skilled in the art in the technical field to which the present disclosure belongs. Terms defined in the dictionary are interpreted to have meanings consistent with related technical document and current disclosure.

Hereinafter, [plated steel sheet] according to an aspect of the present disclosure will be described in detail. When indicating the content of each element in the present disclosure, unless specifically defined otherwise, the content may be indicated in weight %.

In a conventional Zn—Mg—Al-based galvanized alloy steel sheet related technology, Mg may be added to improve corrosion resistance. However, when excessive Mg is added, floating dross may increase in a plating bath, such that the dross may need to be removed frequently, which may be problematic, and an upper limit of Mg content may be limited to 3%.

Accordingly, research has been conducted to further improve corrosion resistance by increasing a Mg content from 3%, but as more Mg is added, a large amount of intermetallic compound having high hardness may be comprised in a plating layer such that there may be a problem of deteriorated bendability (or bending processability), such as causing cracks in a plating layer during a bending process.

In addition to the bendability problem, due to adhesion of Mg-based dross, plating adhesion of a Zn—Mg—Al-based galvanized alloy steel sheet also may deteriorate, which may be problematic.

Accordingly, in the prior art, it may be technically difficult to provide a plated steel sheet having assured corrosion resistance and also having excellent bendability and plating adhesion.

Accordingly, the present inventors conducted intensive studies to solve the above-mentioned problems and to provide a plated steel sheet having excellent corrosion resistance and also excellent bendability and/or plating adhesion, and founded that, in addition to a composition of the plating layer and also a Zn single phase formed along an outline of a $MgZn_2$ phase formed in the plating layer may be an important factor, and completed the present disclosure.

Hereinafter, the configuration of a plated steel sheet having excellent corrosion resistance and also excellent weldability and/or phosphatability will be described in detail.

First, the plated steel sheet according to the present disclosure may comprise a base steel sheet; and a Zn—Mg—Al-based plating layer provided on at least one surface of the base steel sheet.

In the present disclosure, the type of base steel sheet may not be particularly limited. For example, the base steel sheet may be implemented as an Fe-based base steel sheet used as a base steel sheet of general galvanized steel sheet, that is, a hot-rolled steel sheet or a cold-rolled steel sheet, but an embodiment thereof is not limited thereto. Alternatively, the base steel sheet may be, for example, carbon steel, ultra-low carbon steel, or high manganese steel used as a material for construction, home appliances, and automobiles.

However, as an example, the base steel sheet may have a composition of, in weight %, C: more than 0% (more preferably, 0.001% or more) and 0.18% or less, Si: more than 0% (more preferably, 0.001% or more) and 1.5% or less, Mn: 0.01 to 2.7%, P: more than 0% (more preferably, 0.001% or more) and 0.07% or less, S: more than 0% (more preferably, 0.001% or more) and 0.015% or less, Al: more than 0% (more preferably, 0.001% or more) and 0.5% or less, Nb: more than 0% (more preferably, 0.001% or more) and 0.06% or less, Cr: more than 0% (more preferably, 0.001% or more) and 1.1% or less, Ti: more than 0% (more preferably, 0.001% or more) and 0.06% or less, B: more than 0% (more preferably, 0.001% or more) and 0.03% or less and a balance of Fe and inevitable impurities.

Although not particularly limited, according to an embodiment of the present disclosure, at least one surface of the base steel sheet may be provided with a Zn—Mg—Al-based plating layer consisted of a Zn—Mg—Al-based alloy. The plating layer may be formed on only one surface of the base steel sheet, or may be formed on both surfaces of the base steel sheet. In this case, the Zn—Mg—Al-based plating layer may refer to a plating layer comprising Mg and Al and mainly comprising Zn (comprising more than 50% of Zn).

Although not particularly limited, according to an embodiment of the present disclosure, a thickness of the Zn—Mg—Al-based plating layer may be 5 to 100 µm, more preferably to 90 µm. When the thickness of the plating layer is less than 5 µm, the thickness of the plating layer may excessively decrease locally due to errors resulting from the thickness deviation of the plating layer, such that corrosion resistance may deteriorate. When the thickness of the plating layer exceeds 100 µm, cooling of the hot-dip plating layer may be delayed, a solidification defect such as a flow pattern, for example, may occur on the surface of the plating layer, and productivity of the steel sheet may decrease to solidify the plating layer.

Meanwhile, according to an embodiment of the present disclosure, although not particularly limited, an Fe—Al-based inhibition layer may be further comprised between the base steel sheet and the Zn—Mg—Al-based plating layer. The Fe—Al-based inhibition layer may mainly comprise an intermetallic compound of Fe and Al (e.g., more than 60%), and examples of the intermetallic compound of Fe and Al may comprise FeAl, $FeAl_3$, and $Fe_2Al_5$. Also, some components derived from the plating layer, such as Zn and Mg, may be further comprised, for example, up to 40%. The inhibition layer may be formed due to alloying by Fe and plating bath components diffused from the base steel sheet at an initial stage of plating. The inhibition layer may improve adhesion between the base steel sheet and the plating layer, and may also prevent Fe diffusion from the base steel sheet to the plating layer. The inhibition layer may be formed continuously between the base steel sheet and the Zn—Mg—Al-based plating layer, or may be formed discontinuously. In this case, other than the above-mentioned description, regarding the inhibition layer, a commonly known description in the relevant technical field may be applied.

Although not particularly limited, according to an embodiment of the present disclosure, a thickness of the inhibition layer may be 0.02 to 2.5 µm. The inhibition layer may assure corrosion resistance by preventing alloying, but as the layer is brittle, the layer may affect processability, and accordingly, a thickness thereof may be determined to be 2.5 µm or less. However, to function as a inhibition layer, the thickness may be 0.02 µm or more. In terms of further improving the above-mentioned effect, preferably, an upper limit of the thickness of the inhibition layer may be 1.8 µm, or a lower limit of the inhibition layer thickness may be 0.05 µm. In this case, a thickness of the inhibition layer may refer to a minimum thickness in a direction perpendicular to an interfacial surface of the base steel sheet.

Also, although not particularly limited, according to an embodiment of the present disclosure, the Zn—Mg—Al-based plating layer may comprise, by weight %, Mg: 4.0 to 7.0%, Al: 11.0 to 19.5%, and a balance of Zn and inevitable impurities. In the description below, each component will be described in detail.

Mg: 4.0% or More and 7.0% or Less

Mg may improve corrosion resistance of a plated steel material. In the present disclosure, a Mg content in the plating layer may be controlled to 4.0% or more to assure desired excellent corrosion resistance. When Mg is added excessively, dross may occur, and also a hard $MgZn_2$ phase may be excessively formed in the plating layer such that bendability may deteriorate, such as causing cracks in the plating layer during a bending process. Accordingly, the Mg content may be controlled to 7.0% or less.

Al: 11.0% or More and 19.5% or Less

Generally, when Mg is added in an amount of 1% or more, the effect of improving corrosion resistance may be exhibited, but when Mg is added in an amount of 2% or more, floating dross may increase in a plating bath due to oxidation of Mg in the plating bath, such that dross may need to be frequently removed.

Due to this problem, in the prior art, by adding 1.0% or more of Mg in Zn—Mg—Al-based zinc alloy plating, corrosion resistance may be assured, and an upper limit of Mg content may be determined to be 3.0% for commercialization. However, to further improve corrosion resistance, it may be necessary to increase the Mg content to 4% or more. However, when the plating layer comprise 4% or more of Mg, dross may occur due to oxidation of Mg in the plating bath, which may be problematic. Also, plating adhesion may worsen due to adhesion of oxides due to dross or weakening of reactivity with the base steel sheet, such that it may be necessary to add 11.0% or more of Al. When Al is added excessively to suppress dross, however, a melting point of the plating bath may increase and an operating temperature may thus increase excessively, such that problems caused by high-temperature work, such as erosion of the plating bath structure and deterioration of the steel material, may occur.

Accordingly, it may be preferable to control an upper limit of Al content in the plating layer to 19.5%.

Balance of Zn and Inevitable Impurities

In addition to the composition of the plating layer described above, a balance of Zn and other inevitable impurities may be further comprised. Inevitable impurities may comprise components unintentionally mixed in a process of manufacturing general hot-dip galvanized steel sheet, and a person skilled in the relevant technical field may easily understand the addition.

In the plated steel sheet according to the present disclosure, the plating layer may comprise an $MgZn_2$ phase as a microstructure. Also, various phases such as a Zn single phase, a Al—Zn based binary eutectic phase, a Zn—$MgZn_2$—Al based ternary eutectic phase, a Al single phase may be comprised in the plating layer. In this specification, the $MgZn_2$ phase may refer to a phase mainly formed of $MgZn_2$, and the Zn single phase may refer to a phase mainly formed of Zn, and may comprise 85% or more of Zn in weight %. In this case, in the Zn single phase, in addition to the Zn component, additional components of Al and Mg may be dissolved in a range of 15% or less. Also, the Al single phase may refer to a phase mainly formed of Al, and may comprise 85% or more of Al by weight %, and components such as Zn and Mg are solid-solute therein in addition to the Al component. Also, the Zn—$MgZn_2$—Al based ternary eutectic phase may refer to a ternary eutectic phase in which a Zn phase, a $MgZn_2$ phase and an Al phase are mixed, and the Al—Zn based binary eutectic phase may refer to a phase in which the Al phase and the Zn phase are disposed alternately in a lamellar or irregularly mixed form. In this case, it should be noted that the Zn phase comprised in the ternary eutectic phase is not comprised in the Zn single phase formed according to an outline of the $MgZn_2$ phase described later in this specification.

Meanwhile, according to the present disclosure, the plating layer may comprise a Zn single phase formed along the outline of the $MgZn_2$ phase. In a general Zn—Mg—Al-based plated steel sheet, when the Mg component is comprised in a large amount (more than 4%), a large amount of hard $MgZn_2$ phase may be formed in the plating layer, such that bendability may deteriorate, such as causing cracks in the plating layer during the bending process.

Accordingly, the present inventors conducted research and found that, by precisely controlling the plating composition and manufacturing conditions to form a Zn single phase, which is a soft phase, following the outline of the $MgZn_2$ phase, which is a hard phase, in the plating layer, the phase may act as a buffer between the $MgZn_2$ phase and the Zn—$MgZn_2$—Al based ternary eutectic phase, and accordingly, corrosion resistance may improve, and bendability may be assured.

Also, in terms of plating adhesion, by forming a soft phase, a Zn single phase, following the outline of the $MgZn_2$ phase, the Zn single phase may connect the Zn—$MgZn_2$—Al based ternary eutectic phase with the $MgZn_2$ phase, such that plating adhesion may improve.

In this case, the Zn single phase formed along the outline of the $MgZn_2$ phase in the plating layer may be observed through an image of the surface of the plated steel sheet taken using a FE-SEM.

Figure 1:
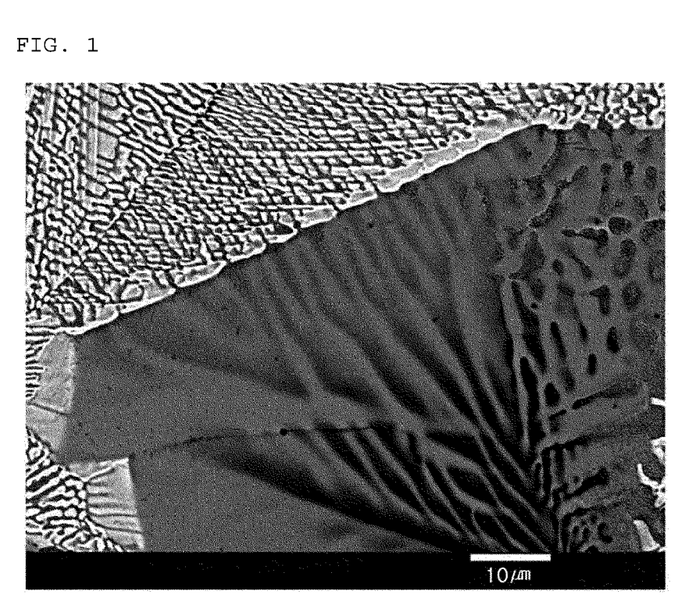
FIG. 1 is a diagram illustrating an image of a surface of a plated steel sheet obtained from embodiment 1 taken using a field emission scanning electron microscope (hereafter, referred to as 'FE-SEM'), magnified at 1,500 times.

For example, to observe the surface structure of the plated steel sheet obtained from Embodiment 1 of the present disclosure, an image taken at a magnification of 1,500 times using FE-SEM is exhibited in FIG. 1. As in FIG. 1, it may be confirmed that a Zn single phase formed along the outline of the $MgZn_2$ phase mainly formed of $MgZn_2$ are present.

Also, whether the phase formed along the outline of the MgZn$_2$ phase corresponds to the Zn single phase was determined using a cross-sectional image taken by the above-described FE-SEM, and also whether the phase is mainly formed of Zn having a Zn weight % content of 85% or more may be identified through energy dispersive spectroscopy (EDS). Meanwhile, in this specification, the Zn single phase formed along the outline of the above-described MgZn$_2$ phase is defined to include both the first Zn single phase and the second Zn single phase, which will be described later.

Also, although not particularly limited, according to an embodiment of the present disclosure, optionally, an average thickness of the Zn single phase formed along the outline of the MgZn$_2$ phase may be 2 to 7 μm.

When the average thickness of the Zn single phase formed along the outline of the MgZn$_2$ phase is less than 2 μm, the Zn single phase working as a buffering role between the MgZn$_2$ phase and the Zn—MgZn$_2$—Al based ternary eutectic phase may be insufficient, such that adhesion may be weakened, and there may be a problem in bending processability and plating adhesion. When the average thickness of the Zn single phase formed along the outline of the MgZn$_2$ phase exceeds 7 μm, the Zn phase may increase excessively and Mg may lack, which may cause a problem in local corrosion resistance. In terms of further improving the above-described effect, more preferably, a lower limit of the average thickness of the Zn single phase formed along the outline of the MgZn$_2$ phase may be 5.0 μm, or an upper limit of the average thickness of the Zn single phase formed along the outline of the MgZn$_2$ phase may be 6.9 μm.

In this case, the method of measuring the average thickness of the Zn single phase formed along the outline of the above-mentioned MgZn$_2$ phase is not particularly limited, but an average thickness of the Zn single phase formed along the outline of the MgZn$_2$ phase may be measured using the plating layer surface image taken by FE-SEM and EDS with respect to the length of the outline of the MgZn$_2$ phase of 5 μm or more.

Figure 2:
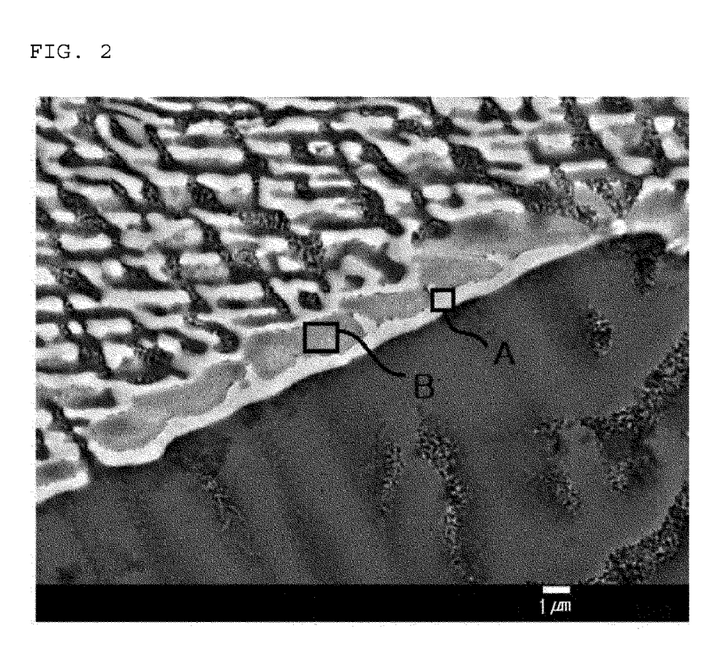
FIG. 2 is a diagram illustrating an image of a surface of a plated steel sheet obtained from embodiment 3 taken using a field emission scanning electron microscope (FE-SEM), magnified at 5,000 times.

Meanwhile, according to the present disclosure, two types of Zn single phases may be formed along the outline of the MgZn$_2$ phase. Primarily, a Zn single phase (hereinafter referred to as 'first Zn single phase') having a Mg solid-solution ratio of less than 4 wt % may be formed adjacent to the outline of the MgZn$_2$ phase. Also, secondarily, a Zn single phase (hereinafter, referred to as 'second Zn single phase') adjacent to the above-mentioned first Zn single phase and having a high Mg solid-solution ratio of 4 wt % or more may be formed. To confirm this, FIG. 2 illustrates an image taken at 5,000× magnification of the surface of the plated steel sheet obtained from Embodiment 3 of the present disclosure. The region corresponding to A in FIG. 2 may correspond to the above-described first Zn single phase formed adjacent to the outline of the MgZn$_2$ phase, and the region corresponding to B in FIG. 2 may correspond to the second Zn single phase formed adjacent to the first Zn single phase.

Therefore, when measuring the average thickness of the Zn single phase formed along the outline of the MgZn$_2$ phase, using the image taken by the above-described FE-SEM, with respect to the length of the outline of the MgZn$_2$ phase of 5 μm or more, an average distance (For example, the average distance from the outline of the MgZn$_2$ phase in FIG. 2 to the region including the 'B' region) from the outline of the MgZn$_2$ phase to the Zn single phase having a high Mg solid-solution ratio of 4 wt % or more may be defined as the aforementioned 'average thickness of Zn single phase.'

Meanwhile, although not particularly limited, but according to an embodiment of the present disclosure, optionally, the ratio of the length in which the Zn single phase formed along the outline of the MgZn$_2$ phase occupies the outline of the MgZn$_2$ phase may be 30 to 98%.

When a ratio of the length of the Zn single phase formed along the outline of the MgZn$_2$ phase occupying the outline of the MgZn$_2$ phase may be less than 30%, a problem may occur in which bendability and adhesion assurance may not be uniform throughout the entire steel sheet. When the ratio of the length of the Zn single phase formed along the outline of the MgZn$_2$ phase occupying the outline of the MgZn$_2$ phase exceeds 98%, corrosion may spread rapidly in the Zn single phase first, such that corrosion resistance may be insufficient.

In terms of further improving the above-mentioned effect, more preferably, a lower limit of the ratio of the length in which the Zn single phase formed along the outline of the MgZn$_2$ phase occupies the outline of the MgZn$_2$ phase may be 60%. Alternatively, an upper limit of the ratio of the length in which the Zn single phase formed along the outline of the MgZn$_2$ phase occupies the outline of the MgZn$_2$ phase may be 90%.

The method of measuring the ratio of the length in which the Zn single phase formed along the outline of the MgZn$_2$ phase occupies the outline of the MgZn$_2$ phase is not particularly limited. However, as an example, the ratio may be obtained by measuring the ratio of the length that a Zn single phase with a Zn content of 85 wt % or more occupies the outline of the MgZn$_2$ phase using an image of the surface of a plated steel sheet taken using a FE-SEM with respect to the outline length of the MgZn$_2$ phase of 5 μm or more. In this case, as described above, the Zn single phase may include both the first Zn single phase and the second Zn single phase described above.

Although not specifically limited, the present inventors conducted a thorough research to further improve the properties of improving adhesion between phases, and found that the Zn single phase formed along the outline of the MgZn$_2$ phase may comprise a Zn single phase (a first Zn single phase) having a Mg solid-solution ratio of less than 4%, and a Zn single phase (a second Zn single phase) having a Mg solid-solution ratio of 4% or more. However, through repeated research, the present inventors found that, among the Zn single phases formed along the outline of the MgZn$_2$ phase, 1) the Zn single phase having a Mg solid-solution ratio of 4% or more may contribute to improving adhesion with the Zn—MgZn$_2$—Al based ternary eutectic phase, and 2) the Zn single phase having a Mg solid-solution ratio of less than 4% may contribute to improving adhesion with the MgZn$_2$ phase.

Specifically, although not particularly limited, according to an embodiment of the present disclosure, optionally, the area ratio of the Zn single phase (or first Zn single phase) having a Mg solid-solution ratio of less than 4 wt % may be 10 to 90% of the total area of the Zn single phase formed along the outline of the MgZn$_2$ phase. When the ratio of the Zn single phase having the Mg solid-solution ratio of less than 4 wt % is less than 10%, the effect of improving connectivity with MgZn$_2$ may be insignificant. When the ratio of the Zn single phase in which the Mg solid-solution ratio is less than 4 wt % is more than 1%, a problem of local uneven connection between phases may occur. In order to further improve the adhesion between the Zn single phase and the MgZn$_2$ phase, more preferably, a lower limit of the ratio of the Zn single phase in which the Mg solid-solution ratio is less than 4 wt % may be 12%, or an upper limit of the ratio of the Zn single phase having the Mg solid-solution ratio of less than 4 wt % may be 75%.

Also, although not particularly limited, according to an embodiment of the present disclosure, optionally, the ratio of the area of the Zn single phase (or second Zn single phase) having a Mg solid-solution ratio of 4 wt % or more may be 10 to 90% of the total area of the Zn single phase formed along the outline of the MgZn2 phase. When the area ratio of the Zn single phase having the Mg solid-solution ratio of 4 wt % or more is less than 10%, the effect of improving connectivity with the Zn—MgZn$_2$—Al based ternary eutectic phase may be insignificant. When the area ratio of the Zn single phase having the Mg solid-solution ratio of 4 wt % or more exceeds 90%, problems in local uneven connection between phases may occur. In order to further improve adhesion between the Zn single phase and the Zn—MgZn$_2$—Al based ternary eutectic phase, a lower limit of the area ratio of the Zn single phase having the Mg solid-solution ratio of 4 wt % or more may be 25%, or an upper limit of the area ratio of the Zn single phase having the Mg solid-solution ratio of 4 wt % or more may be 88%.

Accordingly, according to an embodiment of the present disclosure, optionally, the Zn single phase formed along the outline of the MgZn$_2$ phase may comprise, by area %, a first Zn single phase having a Mg solid-solution ratio of less than 4 wt %:10 to 90% and a second Zn single phase having a Mg solid-solution ratio of 4 wt % or more:10 to 90%. The first Zn single phase may be adjacent to the outline of the MgZn$_2$ phase, or the second Zn single phase may be adjacent to the first Zn single phase. Meanwhile, the above description may be applicable to the first Zn single phase and the second Zn single phase.

In the present specification, the Zn single phase having an Mg solid-solution ratio of 4 wt % or more and the Zn single phase having a Mg solid-solution ratio of less than 4 wt % may be distinct from each other by measuring the Mg weight % content of the Zn single phase at each point measured using FE-SEM and EDS.

Meanwhile, the method for measuring the area ratio of the Zn single phase having a Mg solid-solution ratio of 4 wt % or more and the area ratio of the Zn single phase having a Mg solid-solution ratio of less than 4 wt % is not particularly limited, and for example, the ratios may be measured by calculating the area % of each Zn single phase based on the entire phase of the plating layer, with respect to the plating layer surface having an area of 10 μm$^2$ or more through an image of the plating layer surface taken using FE-SEM and EDS.

However, in the present disclosure, the Zn single phase having a Mg solid-solution ratio of 4 wt % or more may be present in a single connected shape or may be present in the form of islands separated from each other.

Therefore, based on the area of the plating layer surface of 10 μm$^2$ or more, 1) as in FIG. 2, in the case in which the Zn single phase (corresponding to the B region) having a Mg solid-solution ratio of 4 wt % or more is present as a connected shape, the internal region from the outline of the MgZn$_2$ phase to the Zn single phase having a Mg solid-solution ratio of 4 wt % or more may be regarded as 'Zn single phase formed along the outline of the MgZn$_2$ phase', and the area ratio of each Zn single phase (the first Zn single phase and the second Zn single phase) may be measured.

Figure 3:
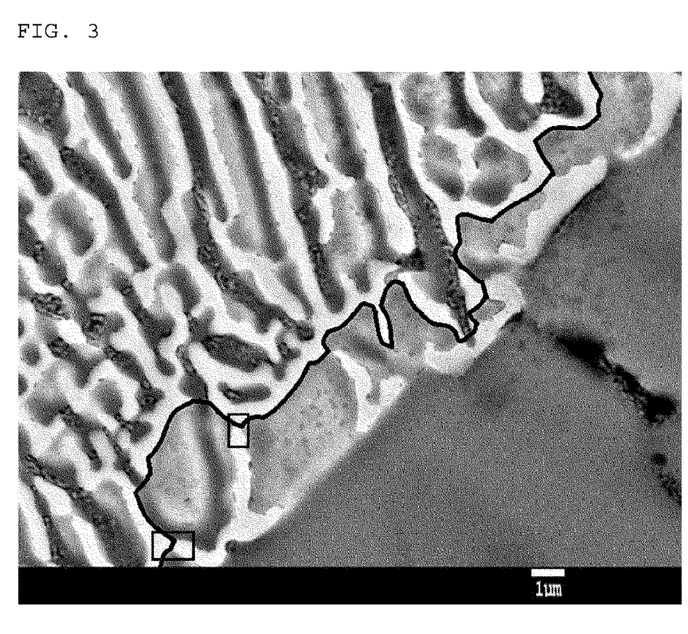
FIG. 3 is a diagram illustrating an image of a surface of a plated steel sheet obtained from embodiment 4 taken using a field emission scanning electron microscope (FE-SEM), magnified at 5,000 times.
Figure 4:
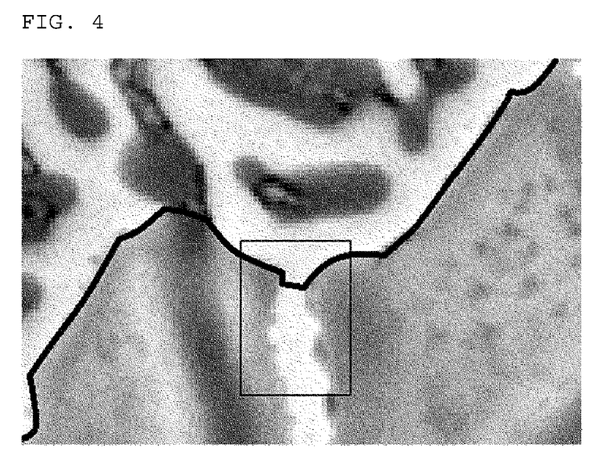
FIG. 4 is an enlarged image of a quadrangular portion in FIG. 3.

Meanwhile, 2) as in FIG. 3, when the Zn single phase having a Mg solid-solution ratio of 4 wt % or more is present in island shapes separated from each other, in the quadrangular portion of FIG. 3 between two adjacent island shapes, a line of the shortest distance may be drawn between two adjacent island shapes as in the quadrangular portion of FIG. 3. An enlarged image of the quadrangular portion is provided in FIG. 4, and in FIG. 4 the line of the shortest distance drawn between two islands is drawn. Thereafter, a line connecting the outer outline of the Zn single phase having a Mg solid-solution ratio of 4 wt % or more and the line of the shortest distance between the aforementioned island shapes is drawn as in FIG. 3. Thereafter, the internal region from the outline of the MgZn$_2$ phase to the above-mentioned connecting line is regarded as 'Zn single phase formed along the outline of the MgZn$_2$ phase', and the area ratio of each Zn single phase (the first Zn single phase and the second Zn single phase) may be measured. In this case, when there are two or more shortest distance lines of the same length between the above-described island shapes, the area ratio of each Zn single phase may be measured through the method described above based on the line of the shortest distance closest to the outline of the MgZn$_2$ phase as a reference.

In the description below, the [method of manufacturing plated steel sheet] according to another aspect of the present disclosure will be described in detail. However, the plated steel sheet in the present disclosure may need to be manufactured by the manufacturing method below.

According to an embodiment of the present disclosure, preparing a base steel sheet may be further comprised, and the type of the base steel sheet is not particularly limited. A Fe-based base steel sheet used as the base steel sheet of the general galvanized steel sheet may be a hot-rolled steel sheet or a cold-rolled steel sheet, but an embodiment thereof is not limited thereto. Also, the base steel sheet may be, for example, carbon steel, ultra-low carbon steel, or high manganese steel used as a material for construction, home appliances, and automobiles, but an embodiment thereof is not limited thereto. In this case, the above description may be applied to the base steel sheet.

Thereafter, hot-dip galvanizing may be performed on the prepared base steel sheet by immersing the prepared base steel sheet in a plating bath comprising, by weight %, Mg: 4.0 to 7.0%, Al: 11.0 to 19.5%, and a balance of Zn and inevitable impurities to an immersing temperature of $T_B$+10° C. to $T_B$+50° C. based on the plating bath temperature ($T_B$).

In this case, according to an embodiment of the present disclosure, as for the reason for adding components and limiting the contents thereof in the plating bath described above, excluding the small amount of Fe content which may enter from the base steel sheet, the description of the components of the plating layer described above may be applied.

Meanwhile, to manufacture a plating bath having the above-described composition, a composite ingot comprising predetermined Zn, Al and Mg or a Zn—Mg or a Zn—Al ingot comprising individual components may be used. To replenish the plating bath consumed by hot-dip plating, the ingot may be further melted and supplied. In this case, the ingot may be dissolved by being directly immersed in a plating bath, or the ingot may be melted in a separate pot and the molten metal may be added to the plating bath.

Also, during the hot-dip galvanizing, an immersing temperature of the base steel sheet may be controlled to satisfy the range of $T_B$+10° C. to $T_B$+50° C. based on a plating bath temperature ($T_B$). In this case, although not particularly limited, the plating bath temperature ($T_B$) may be maintained in the range of 440 to 500° C. By determining the immersing temperature into the plating bath as above, interfacial adhesion between the base steel sheet and the plating layer may be improved.

When the immersing temperature of the base steel sheet is less than $T_B+10°$ C., interfacial adhesion may be insufficient, and the problem of dross adhesion may occur. When the immersing temperature of the base steel sheet exceeds $T_B+50°$ C., generation of ash (Zn fume) may increase and ash may be adsorbed to the steel sheet, which may cause problems in plating surface quality.

In this case, more preferably, in terms of further improving the above-described effect, a lower limit of the immersing temperature of the base steel sheet may be $T_B+20°$ C., and an upper limit of the immersing temperature of the base steel sheet may be in the range $T_B+45°$ C.

Thereafter, air-wiping may be performed on the hot-dip galvanized steel sheet using an inert gas to satisfy relational expression 1 below. By controlling the conditions of air-wiping to satisfy relational expression 1, a Zn single phase structure formed along the outline of the $MgZn_2$ phase specified in the present disclosure may be assured, and smooth and uniform surface properties may be assured, such that the effect of improving bendability may be obtained. In this case, relational expression 1 below may be a value obtained empirically, such that the unit may not be specifically determined, and may satisfy mm, the unit of $W_{air}$, kPa, the unit of $P_{air}$, and ° C., the unit of T, defined below.

$$0.005 \leq P_{air}/(W_{air} \times T) \quad \text{[Relational expression 1]}$$

(In the Relational expression 1, $W_{air}$ represents a spacing between air knives, and a unit is mm. $P_{air}$ represents pressure of the air knife, and a unit thereof is kPa. T represents a temperature of the supplied inert gas, and a unit thereof is ° C.)

Meanwhile, although not particularly limited, according to an embodiment of the present disclosure, argon (Ar) gas, nitrogen ($N_2$) gas, or a mixed gas of argon and nitrogen may be used as the inert gas, and it may be more preferable to use nitrogen gas.

Also, according to an embodiment of the present disclosure, in the above-described air-wiping, a spacing between the air knives may be in the range of 20 to 45 mm (more preferably, 30 to 40 mm). Alternatively, pressure of the air knife may be in the range of 8 to 20 kPa (more preferably, 10 to 18 kPa). Alternatively, the temperature of the supplied gas may be in the range of 30 to 100° C. (more preferably, 65 to 85° C.). By adjusting the air-wiping conditions to satisfy the above-mentioned range, a plated steel sheet having excellent corrosion resistance, bendability and plating adhesion may be manufactured.

Thereafter, the air-wiped steel sheet may be cooled at an average cooling rate of 2 to 5° C./s based on a surface temperature up to the solidification end temperature. In the cooling after the air-wiping, when the average cooling rate is less than 2° C./s, problems may occur in productivity of the plated steel sheet, and when the rate is more than 5° C./s, a Zn single phase structure formed along the outline of the $MgZn_2$ phase specified in the present disclosure may not be formed.

Meanwhile, although not particularly limited, according to an embodiment of the present disclosure, optionally, the cooling may be performed in three steps, comprising primary cooling in which the air-wiped steel sheet is cooled to a temperature range of 450° C. or less and 420° C. or more at an average cooling rate of 1.0 to 2.0° C./s; secondary cooling in which the primarily cooled steel sheet is cooled to a temperature range of less than 420° C. and 340° C. or more at an average cooling rate of 2.1 to 4.0° C./s; and tertiary cooling in which the secondarily cooled steel sheet is cooled to a temperature range of less than 340° C. and 150° C. or more at an average cooling rate of 5.0 to 7.0° C./s.

The present inventors conducted research and found that by performing slow cooling, dividing the cooling into primary, secondary and tertiary cooling sections, and gradually increasing the cooling rate in each section, bendability was improved. Specifically, during the primary cooling, when the average cooling rate is less than 1.0° C./s, there may be problems in productivity of the steel sheet. During the primary cooling, when the average cooling rate exceeds 2.0° C./s, there may be problems in assuring uniform interfacial adhesion between the base steel sheet and the plating layer. Also, during the secondary cooling, when the average cooling rate is less than 2.1° C./s, there may be problems in productivity of the steel sheet. During the secondary cooling, when the average cooling rate exceeds 4.0° C./s, problems may occur in ensuring adhesion between $MgZn_2$ and a Zn single phase in the plating layer. Also, during the tertiary cooling, when the average cooling rate is less than 5.0° C./s, there may be a problem in which the plating layer may stick to a cooling tower top roll due to a delay in completion of solidification of the steel sheet. During the tertiary cooling, when the average cooling rate exceeds 7.0° C./s, problems may occur in adhesion between the Zn single phase and the Zn—$MgZn_2$—Al based ternary eutectic phase in the plating layer.

Meanwhile, although not particularly limited, according to an embodiment of the present disclosure, optionally, during the cooling, relational expression 2 may be further satisfied. By controlling the relationship between the average cooling rate during tertiary cooling and the average cooling rate during the primary and secondary cooling as in relational expression 2 below, adhesion between the $MgZn_2$ phase and the Zn single phase and adhesion between the Zn—$MgZn_2$—Al based ternary eutectic phase and the Zn single phase may be promoted, such that bendability of the plating layer may be further improved.

$$C_1 + C_2 \leq C_3 \leq 1.5 \times (C_1 + C_2) \quad \text{[Relational expression 2]}$$

(In the Relational expression 2, $C_1$ is an average cooling rate [° C./s] during primary cooling, $C_2$ is an average cooling rate [° C./s] during secondary cooling, and $C_3$ is an average cooling rate [° C./s] during tertiary cooling.)

As described above, by precisely controlling the plating composition and manufacturing conditions, a plated steel sheet having excellent corrosion resistance, and having one or more of excellent properties among bendability, and plating adhesion.

MODE FOR INVENTION

Embodiment

Hereinafter, the present disclosure will be described in greater detail through embodiments. However, it may be important to note that the embodiments may be only intended to describe the present disclosure through examples and is not intended to limit the scope of rights of the present disclosure. This is because the scope of rights in present disclosure is determined by matters stated in the claims and matters reasonably inferred therefrom.

Experimental Example 1

A base steel sheet having a composition comprising C: 0.018%, Si: 0.01%, Mn: 0.2%, P: 0.009%, S: 0.005%, Al: 0.1%, Nb: 0.02%, Cr: 0.2%, Ti: 0.02%, B: 0.015%, and a balance of Fe and inevitable impurities, and having a thickness of 2 mm and a width of 1300 mm may be prepared.

Hot-dip galvanizing was performed by immersing the prepared base steel sheet in a plating bath under the conditions as in Table 1 below. Subsequently, the hot-dip galvanized steel sheet went through an air-wiping treatment using nitrogen ($N_2$) gas under the conditions as in Table 1 below, and was cooled under the conditions as in Table 2 below.

TABLE 1

| No. | Plating bath composition (balance of Zn and inevitable impurities) [wt %] Mg | Al | Plating bath temperature [°C.] | Base steel sheet immersing temperature [°C.] | Air knife unilateral spacing [mm] | Air knife pressure [kPa] | Supplied nitrogen temperature [°C.] |
|---|---|---|---|---|---|---|---|
| Embodiment 1 | 4.0 | 11.0 | 440 | 450 | 20 | 10 | 30 |
| Embodiment 2 | 4.5 | 11.5 | 450 | 460 | 25 | 11 | 35 |
| Embodiment 3 | 5.0 | 12.3 | 455 | 475 | 30 | 12 | 40 |
| Embodiment 4 | 5.5 | 14.5 | 460 | 470 | 35 | 13 | 45 |
| Embodiment 5 | 6.0 | 19.1 | 490 | 500 | 45 | 15 | 55 |
| Comparative example 1 | 3.8 | 9.0 | 440 | 450 | 30 | 12 | 40 |
| Comparative example 2 | 6.4 | 10.3 | 450 | 460 | 35 | 13 | 45 |
| Comparative example 3 | 5.6 | 7.9 | 470 | 480 | 40 | 14 | 50 |
| Comparative example 4 | 7.0 | 20.1 | 490 | 500 | 45 | 15 | 55 |
| Comparative example 5 | 3.8 | 9.0 | 440 | 440 | 30 | 12 | 40 |
| Comparative example 6 | 7.3 | 20.5 | 500 | 480 | 35 | 9 | 55 |
| Comparative example 7 | 7.6 | 19.2 | 490 | 490 | 50 | 13 | 60 |
| Comparative example 8 | 4.3 | 8.0 | 470 | 460 | 45 | 14 | 70 |
| Comparative example 9 | 4.8 | 6.2 | 460 | 450 | 30 | 11 | 80 |
| Comparative example 10 | 6.7 | 10.9 | 470 | 470 | 25 | 10 | 90 |
| Comparative example 11 | 7.8 | 21.0 | 510 | 490 | 25 | 10 | 90 |
| Comparative example 12 | 6.0 | 10.7 | 460 | 450 | 30 | 11 | 80 |
| Comparative example 13 | 6.8 | 7.8 | 490 | 480 | 40 | 5 | 30 |
| Comparative example 14 | 5.3 | 12.2 | 460 | 480 | 40 | 7 | 50 |

TABLE 2

| No. | C* |
|---|---|
| Embodiment 1 | 2.9 |
| Embodiment 2 | 3.1 |
| Embodiment 3 | 3.3 |
| Embodiment 4 | 3.9 |
| Embodiment 5 | 4.4 |
| Comparative example 1 | 4.6 |
| Comparative example 2 | 4.5 |
| Comparative example 3 | 3.7 |
| Comparative example 4 | 2.8 |
| Comparative example 5 | 3.6 |
| Comparative example 6 | 4.7 |
| Comparative example 7 | 3.9 |
| Comparative example 8 | 3.8 |
| Comparative example 9 | 1.6 |
| Comparative example 10 | 7.2 |
| Comparative example 11 | 7.8 |

TABLE 2-continued

| No. | C* |
|---|---|
| Comparative example 12 | 5.5 |
| Comparative example 13 | 6.5 |
| Comparative example 14 | 6.1 |

C*: Average cooling rate to reach solidification end temperature [° C./s]

A sample of the plated steel sheet obtained by the method in Tables 1 to 2 was prepared, the plating layer was dissolved in a hydrochloric acid solution, the dissolved liquid was analyzed by wet analysis (ICP) to measure the composition of the plating layer, and the results were listed in Table 3 (a balance of Zn and inevitable impurities are comprised).

Also, a cross-sectional sample cut in the thickness direction (the direction perpendicular to the rolling direction) of the steel sheet was manufactured such that an interfacial surface between the plating layer and the base steel sheet was able to observed, the sample was imaged using an SEM, and it was confirmed that a Fe—Al-based inhibition layer having a thickness of 0.1 to 1 μm was formed between the base steel sheet and the Zn—Mg—Al-based plating layer.

Also, the surface of the steel sheet was imaged at a magnification of 1,500 using a FE-SEM and EDS, and the presence or absence of a Zn single phase formed along the outline of the $MgZn_2$ phase was determined by indicating presence or absence [o/X] in Table 3 below.

In this case, whether the Zn single phase is formed was identified using the taken surface image using a FE-SEM and EDS based on whether the phase is a Zn single phase comprising 85% or more of Zn content (wt %).

Also, using FE-SEM, the average thickness of the Zn single phase formed along the outline of the $MgZn_2$ phase was measured based on the outline length of the $MgZn_2$ phase of 5 μm, and was listed in Table 3 below.

TABLE 3

| No. | Plating layer composition [wt %] Mg | Plating layer composition [wt %] Al | Zn single phase formed along outline of $MgZn_2$ phase Presence or absence [○/X]* | Zn single phase formed along outline of $MgZn_2$ phase Average thickness [μm] |
|---|---|---|---|---|
| Embodiment 1 | 4.0 | 11.1 | ○ | 2.1 |
| Embodiment 2 | 4.5 | 11.6 | ○ | 2.3 |
| Embodiment 3 | 5.0 | 12.4 | ○ | 2.5 |
| Embodiment 4 | 5.5 | 14.6 | ○ | 3.3 |
| Embodiment 5 | 6.0 | 19.2 | ○ | 3.8 |
| Comparative example 1 | 3.8 | 9.1 | ○ | 1.9 |
| Comparative example 2 | 6.4 | 10.4 | ○ | 1.7 |
| Comparative example 3 | 5.6 | 8.0 | ○ | 1.4 |
| Comparative example 4 | 7.0 | 20.2 | ○ | 1.2 |
| Comparative example 5 | 3.8 | 9.1 | ○ | 0.7 |
| Comparative example 6 | 7.3 | 20.6 | ○ | 0.5 |
| Comparative example 7 | 7.6 | 19.3 | ○ | 0.6 |
| Comparative example 8 | 4.3 | 8.1 | ○ | 0.7 |
| Comparative example 9 | 4.8 | 6.3 | ○ | 1.5 |
| Comparative example 10 | 6.7 | 10.9 | ○ | 1.3 |
| Comparative example 11 | 7.8 | 21.1 | X | — |
| Comparative example 12 | 6.0 | 10.8 | X | — |
| Comparative example 13 | 6.8 | 7.9 | X | — |
| Comparative example 14 | 5.3 | 12.2 | X | — |

○: Zn single phase formed along the outline of the $MgZn_2$ phase is present
X: No Zn single phase formed along the outline of the $MgZn_2$ phase is present As for embodiment and comparative example, properties were evaluated based on the criteria as below, and the evaluation results of each properties were listed in Table 4 below.

<Corrosion Resistance>

In order to evaluate corrosion resistance, corrosion resistance was evaluated according to the criteria as below using a salt spray tester (SST) using a test method in accordance with ISO14993.

○: The time taken for red rust is 30 times or more and less than 40 times relative to that of Zn plating of the same thickness.
  Δ: The time taken for red rust is 20 times or more and less than 30 times relative to that of Zn plating of the same thickness.
  x: The time taken for red rust is less than 20 times relative to that of Zn plating of the same thickness <Bendability>

In order to evaluate cracks in the bent portion, the material was cut into 30 mm×100 mm, and the number of cracks formed in 10 mm of the length after 3t bending was observed using FE-SEM, and bendability was evaluated based on the criteria as below.

◎: Less than 5
  ○: 5 or more but less than 10
  Δ: 10 or more but less than 20
  x: 20 or more <Plating Adhesion>

To evaluate plating adhesion, the material is cut into 30 mm×100 mm, each plated steel material went through a 180° bending process (OT bending), each sample gone through the bending process was taped, the area of the peeled sample was measured, and plating adhesion was evaluated according to the criteria as below.

The evaluation criteria for plating adhesion are as below.

◎: No peeling area
  ○: Peeling area is more than 0% but less than 3%
  Δ: Peeling area is 3 to 10%
  x: Peeling area is 10% or more

TABLE 4

| No. | Corrosion resistance | Bendability | Plating adhesion |
|---|---|---|---|
| Embodiment 1 | ○ | ○ | ○ |
| Embodiment 2 | ○ | ○ | ○ |
| Embodiment 3 | ○ | ○ | ○ |
| Embodiment 4 | ○ | ○ | ○ |
| Embodiment 5 | ○ | ○ | ○ |
| Comparative example 1 | X | Δ | ○ |

TABLE 4-continued

| No. | Corrosion resistance | Bendability | Plating adhesion |
|---|---|---|---|
| Comparative example 2 | ○ | Δ | X |
| Comparative example 3 | X | ○ | X |
| Comparative example 4 | ○ | X | Δ |
| Comparative example 5 | X | Δ | Δ |
| Comparative example 6 | ○ | Δ | Δ |
| Comparative example 7 | ○ | Δ | Δ |
| Comparative example 8 | X | Δ | Δ |
| Comparative example 9 | X | Δ | Δ |
| Comparative example 10 | ○ | X | X |
| Comparative example 11 | ○ | X | X |
| Comparative example 12 | ○ | X | X |
| Comparative example 13 | ○ | X | X |
| Comparative example 14 | ○ | X | X |

As indicated in the experimental results in Table 4 above, in embodiments 1 to 5 satisfying the plating composition and manufacturing conditions specified in the present disclosure, corrosion resistance, bendability and plating adhesion were excellent.

In comparative example 1 to 14, which does not satisfy one or more of the plating composition and manufacturing conditions specified in the present disclosure, one or more properties of corrosion resistance, bendability and plating adhesion were further deteriorated than in embodiments 1 to 5.

Experimental Example 2

A plated steel sheet was manufactured in the same manner as in experimental example 1 described above other than that the hot-dip galvanizing and air-wiping treatment were performed under the conditions as in Table 5 below, three stages of cooling were performed by dividing into primary, secondary and tertiary and controlling the average cooling rate under the conditions as in Table 6 below.

In this case, the analysis was performed in the same manner as in experimental example 1, and it was confirmed that a Fe—Al based inhibition layer having a thickness of 0.3 μm was formed between the base steel sheet and the Zn—Mg—Al-based plating layer.

Meanwhile, the plating layer composition, the presence or absence of a Zn single phase formed along the outline of the $MgZn_2$ phase, and the average thickness were measured in the same manner as in experimental example 1 described above and were listed in Table 7 below.

Also, using FE-SEM and EDS, the ratio of the Zn single phase formed along the outline of the $MgZn_2$ phase occupying the 10 μm outline length of the $MgZn_2$ phase was measured in the same manner as described above in the specification, and was listed in Table 7 below.

Also, based on the surface of the plating layer with an area of 25 μm² taken using a FE-SEM and EDS, the area ratio of the Zn single phase having a Mg solid-solution ratio of 4 wt % or more and the area ratio of Zn single phase having a Mg solid-solution ratio of less than 4 wt % were measured, and were listed in Table 7 below.

Also, as for the plated steel sheets obtained from each embodiment and comparative example, corrosion resistance, bendability and plating adhesion were evaluated in the same manner as in experimental example 1, and were listed in Table 8 below.

TABLE 5

| | Plating conditions | | | | | |
|---|---|---|---|---|---|---|
| | Plating bath composition (balance of Zn and inevitable impurities) [wt %] | | Plating bath temperature | Base steel sheet immersing temperature | Air-wiping conditions | | |
| | | | | | Air knife unilateral spacing | Air knife pressure | Supplied nitrogen temperature |
| No. | Mg | Al | [° C.] | [° C.] | [mm] | [kPa] | [° C.] |
| Embodiment 6 | 4.0 | 11.0 | 440 | 450 | 20 | 10 | 30 |
| Embodiment 7 | 5.8 | 17.6 | 475 | 485 | 40 | 14 | 50 |
| Embodiment 8 | 4.5 | 11.5 | 450 | 470 | 30 | 16 | 65 |
| Embodiment 9 | 5.0 | 12.3 | 455 | 485 | 35 | 17 | 75 |
| Embodiment 10 | 6.0 | 19.1 | 490 | 535 | 40 | 18 | 85 |
| Comparative example 15 | 6.4 | 10.3 | 450 | 450 | 35 | 13 | 45 |
| Comparative example 16 | 5.6 | 7.9 | 470 | 480 | 40 | 5 | 30 |

TABLE 6

| No. | Primary cooling* Average cooling rate [° C./s] | Secondary cooling* Average cooling rate [° C./s] | Tertiary cooling* Average cooling rate [° C./s] | Up to solidification end temperature Average cooling rate [° C./s] |
|---|---|---|---|---|
| Embodiment 6 | 0.9 | 2.1 | 5.1 | 2.9 |
| Embodiment 7 | 1.4 | 3.7 | 7.8 | 4.0 |
| Embodiment 8 | 1.1 | 3.6 | 7.0 | 3.3 |
| Embodiment 9 | 1.3 | 2.3 | 5.2 | 3.2 |
| Embodiment 10 | 1.9 | 3.3 | 6.8 | 4.4 |

TABLE 6-continued

| No. | Primary cooling* Average cooling rate [° C./s] | Secondary cooling* Average cooling rate [° C./s] | Tertiary cooling* Average cooling rate [° C./s] | Up to solidification end temperature Average cooling rate [° C./s] |
|---|---|---|---|---|
| Comparative example 15 | 4.5 | 5.6 | 2.1 | 2.7 |
| Comparative example 16 | 4.3 | 5.9 | 1.9 | 2.5 |

Primary cooling*: cooling in the temperature range of 450° C. or less and 420° C. or more
Secondary cooling*: cooling in the temperature range of less than 420° C. and 340° C. or more
Tertiary cooling*: Cooling in the temperature range less than 340° C. and 150° C. or more

TABLE 7

| | Plating layer composition [wt %] | | Zn single phase formed along outline of MgZn$_2$ phase | | | As compared to entire area of Zn single phase formed along outline of MgZn$_2$ phase | |
|---|---|---|---|---|---|---|---|
| | | | Presence or absence | Ratio of occupying MgZn2 phase outline | Average thickness | Area ratio of Zn single phase with Mg solid-solution ratio of 4 wt % or more | Area ratio of Zn single phase with Mg solid-solution ratio less than 4 wt % |
| No. | Mg | Al | [O/X] | [%] | [μm] | [area %] | [area %] |
| Embodiment 6 | 4.0 | 11.1 | ○ | 29 | 2.1 | 9 | 91 |
| Embodiment 7 | 5.8 | 17.7 | ○ | 57 | 3.6 | 51 | 49 |
| Embodiment 8 | 4.5 | 11.6 | ○ | 75 | 5.2 | 64 | 36 |
| Embodiment 9 | 5.0 | 12.4 | ○ | 65 | 5.7 | 25 | 75 |
| Embodiment 10 | 6.0 | 19.2 | ○ | 89 | 6.9 | 88 | 12 |
| Comparative example 15 | 6.4 | 10.4 | ○ | 15 | 1.0 | 63 | 37 |
| Comparative example 16 | 5.6 | 8.0 | ○ | 26 | 1.1 | 85 | 15 |

TABLE 8

| No. | Corrosion resistance | Bendability | Plating adhesion |
|---|---|---|---|
| Embodiment 6 | ○ | ○ | ○ |
| Embodiment 7 | ○ | ○ | ○ |
| Embodiment 8 | ○ | ⊚ | ⊚ |
| Embodiment 9 | ○ | ⊚ | ⊚ |
| Embodiment 10 | ○ | ⊚ | ⊚ |
| Comparative example 15 | ○ | Δ | Δ |
| Comparative example 16 | ○ | Δ | Δ |

As indicated in the experimental results in Table 8 above, in embodiments 6 to 10 satisfying the plating composition and manufacturing conditions specified in the present disclosure, corrosion resistance, bendability and plating adhesion were excellent.

In particular, among the above embodiments, in embodiments 8 to 10, which perform three stages of cooling specified in the present disclosure, bendability was further improved as compared to embodiments 6 and 7. This is because, in embodiments 8 to 10, the occupation ratio and the average thickness of the Zn single phase formed along the outline of the MgZn$_2$ phase were large, such that a large amount of soft Zn single phase was formed around the hard MgZn$_2$ phase, and accordingly, bendability was excellent. Also, the Zn single phase having a Mg solid-solution ratio of 4% or more contributed to improving interphase adhesion with the Zn—MgZn$_2$—Al based ternary eutectic phase, and the Zn single phase having a Mg solid-solution ratio of less than 4% contributed to improvement of adhesion with the MgZn$_2$ phase, and ultimately contributed to improvement of plating adhesion.

In comparative examples 15 and 16, which did not satisfy the plating composition and manufacturing conditions specified in the present disclosure, one or more properties of corrosion resistance, bendability and plating adhesion were more deteriorated than in embodiments 6 to 16.

The invention claimed is:

1. A plated steel sheet, comprising:
    a base steel sheet; and
    a Zn—Mg—Al-based plating layer provided on at least one side of the base steel sheet,
    wherein the plating layer comprises a MgZn$_2$ phase; and a Zn single phase formed along an outline of the MgZn$_2$ phase.

2. The plated steel sheet of claim 1, wherein the plating layer comprises, by weight %, Mg: 4.0 to 7.0%, Al: 11.0 to 19.5%, and a balance of Zn and inevitable impurities.

3. The plated steel sheet of claim 1, further comprising:
    a Fe—Al based inhibition layer provided between the base steel sheet and the Zn—Mg—Al-based plating layer.

4. The plated steel sheet of claim 1, wherein a ratio of a length in which a Zn single phase formed along an outline of the MgZn$_2$ phase occupies an outline of the MgZn$_2$ phase is 30 to 98%.

5. The plated steel sheet of claim 1, wherein an average thickness of an Zn single phase formed along an outline of the $MgZn_2$ phase is 2 to 7 μm.

6. The plated steel sheet of claim 5, wherein a Zn single phase formed according to an outline of the $MgZn_2$ phase comprises, by area %, a first Zn single phase having a Mg solid-solution ratio of less than 4 wt %:10 to 90% and a second Zn single phase having a Mg solid-solution ratio of 4 wt % or more:10 to 90%.

7. The plated steel sheet of claim 6, wherein the first Zn single phase is adjacent to an outline of the $MgZn_2$ phase.

8. A method for manufacturing a plated steel sheet, the method comprising:
  hot-dip galvanizing a base steel sheet by immersing the base steel sheet in a plating bath comprising, by weight %, Mg: 4.0 to 7.0%, Al: 11.0 to 19.5%, and a balance of Zn and inevitable impurities to satisfy an immersing temperature of $T_B+10°$ C. to $T_B+50°$ C. based on a plating bath temperature ($T_B$);
  performing air-wiping on the hot-dip galvanized steel sheet using an inert gas to satisfy relational expression 1 below; and
  cooling the air-wiped steel sheet at an average cooling rate of 2 to 5° C./s until a solidification end temperature, $$0.005 \leq P_{air}/(W_{air} \times T) \quad \text{[Relational expression 1]}$$

In the Relational expression 1, $W_{air}$ is a spacing between air knives, and a unit is mm. $P_{air}$ is pressure of the air knife, and a unit thereof is kPa. T is a temperature of the supplied inert gas, and a unit thereof is ° C.

9. The method of claim 8, wherein the cooling comprises:
  primary cooling in which the air-wiped steel sheet is cooled to a temperature range of 450° C. or less and 420° C. or more at an average cooling rate of 1.0 to 2.0° C./s;
  secondary cooling in which the primarily cooled steel sheet is cooled to a temperature range of less than 420° C. and 340° C. or more at an average cooling rate of 2.1 to 4.0° C./s; and
  tertiary cooling in which the secondarily cooled steel sheet is cooled to a temperature range of less than 340° C. and 150° C. or more at an average cooling rate of 5.0 to 7.0° C./s.

10. The method of claim 9, wherein the cooling satisfies relational expression 2 as below:

$$C_1+C_2 \leq C_3 \leq 1.5 \times (C_1+C_2) \quad \text{[Relational expression 2]}$$

In the Relational expression 2, $C_1$ is an average cooling rate [° C./s] during primary cooling, $C_2$ is an average cooling rate [° C./s] during secondary cooling, and $C_3$ is an average cooling rate [° C./s] during tertiary cooling.

* * * * *